United States Patent
Brennan

(10) Patent No.: US 11,614,889 B2
(45) Date of Patent: Mar. 28, 2023

(54) AGGREGATING COMMANDS IN A STREAM BASED ON CACHE LINE ADDRESSES

(71) Applicant: ADVANCED MICRO DEVICES, INC., Santa Clara, CA (US)

(72) Inventor: Christopher J. Brennan, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/205,094

(22) Filed: Nov. 29, 2018

(65) Prior Publication Data

US 2020/0174697 A1 Jun. 4, 2020

(51) Int. Cl.
 *G06F 3/06* (2006.01)
 *G06F 12/0804* (2016.01)

(52) U.S. Cl.
 CPC .......... *G06F 3/0659* (2013.01); *G06F 3/0604* (2013.01); *G06F 3/0673* (2013.01); *G06F 12/0804* (2013.01); *G06F 2212/1044* (2013.01); *G06F 2212/608* (2013.01)

(58) Field of Classification Search
 CPC .... G06F 3/0659; G06F 3/0604; G06F 3/0673; G06F 10/0804; G06F 2210/1044; G06F 2210/608
 See application file for complete search history.

(56) References Cited

U.S. PATENT DOCUMENTS

| | | | | |
|---|---|---|---|---|
| 5,586,294 A | * | 12/1996 | Goodwin | G06F 13/1631 710/52 |
| 6,249,851 B1 | * | 6/2001 | Richardson | G06F 12/0859 711/146 |
| 6,434,639 B1 | * | 8/2002 | Haghighi | G06F 12/0831 710/39 |

(Continued)

FOREIGN PATENT DOCUMENTS

WO 2012118743 A1 9/2012

OTHER PUBLICATIONS

International Search Report and Written Opinion dated Oct. 4, 2019 for International Application No. PCT/US2019/037657, 11 pages.

(Continued)

*Primary Examiner* — Ramon A. Mercado

(57) ABSTRACT

An operation combiner receives a series of commands with read addresses, a modification operation, and write addresses. In some cases, the commands have serial dependencies that limit the rate at which they can be processed. The operation combiner compares the addresses for compatibility, transforms the operations to break serial dependencies, and combines multiple source commands into a smaller number of aggregate commands that can be executed much faster than the source commands. Some embodiments of the operation combiner receive a first command including one or more first read addresses and a first write address. The operation combiner compares the first read addresses and the first write address to one or more (Continued)

second read addresses and a second write address of a second command stored in a buffer. The operation combiner selectively combines the first and second commands to form an aggregate command based on the comparison.

20 Claims, 7 Drawing Sheets

(56) References Cited

U.S. PATENT DOCUMENTS

| | | | |
|---|---|---|---|
| 6,611,956 B1* | 8/2003 | Ogawa | G06F 8/443 717/152 |
| 8,112,595 B1* | 2/2012 | Bar-El | G06F 13/4243 711/155 |
| 2002/0087801 A1* | 7/2002 | Bogin | G06F 12/0835 711/144 |
| 2005/0078696 A1* | 4/2005 | Oner | G06F 12/0804 711/E12.04 |
| 2005/0154832 A1* | 7/2005 | Steely | G06F 9/3834 711/144 |
| 2006/0090044 A1* | 4/2006 | Hillier | G06F 9/3004 711/155 |
| 2006/0248520 A1* | 11/2006 | Kawabata | G06F 8/443 717/160 |
| 2008/0235484 A1* | 9/2008 | Tai | G06F 13/28 711/201 |
| 2008/0307204 A1* | 12/2008 | Tam | G06F 5/017 712/E9.034 |
| 2011/0289279 A1* | 11/2011 | Sonnier | G06F 12/0804 711/144 |
| 2012/0059804 A1* | 3/2012 | Tapply | H03M 7/30 707/693 |
| 2014/0156948 A1* | 6/2014 | Roberts | G06F 12/0862 711/143 |
| 2015/0039862 A1* | 2/2015 | Barowski | G06F 9/30145 712/218 |
| 2015/0046655 A1* | 2/2015 | Nystad | G06T 1/60 711/125 |
| 2015/0253995 A1* | 9/2015 | Zhao | G06F 3/0659 710/5 |
| 2018/0246817 A1* | 8/2018 | Feehrer | G06F 3/0631 |
| 2019/0034306 A1* | 1/2019 | Wysocki | G06F 11/2094 |
| 2020/0065028 A1* | 2/2020 | Keil | G06F 3/0659 |

OTHER PUBLICATIONS

International Preliminary Report on Patentability issued in Application No. PCT/US2019/037657 dated May 25, 2021, 8 pages.
Extended European Search Report dated Jul. 12, 2022 for PCT Application No. 19888288.8, 9 pages.
Office Action dated Jan. 12, 2023 for Indian Application No. 202117024603, 8 pages.

* cited by examiner

AGGREGATING COMMANDS IN A STREAM BASED ON CACHE LINE ADDRESSES

BACKGROUND

Compression is used to reduce the number of bytes that represent a piece of information, e.g., to reduce the amount of bandwidth needed to transmit the information over an interface. A typical compression technique uses a backward reference to represent a current chunk of data as a pointer to a previous chunk of data (or data in another spatial or temporal location) plus information indicating a modification to the previous chunk of data. For example, three bytes of data at a first address can be compressed by representing the three bytes of data as a pointer to a second address that is offset by one kilobyte (kB) from the first address plus information indicating a modification such as adding a one to the three bytes of data at the second address. The data is reconstructed at the destination by copying the previously received data (e.g., the three bytes of data at the second address) and performing the indicated modification such as adding the one.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
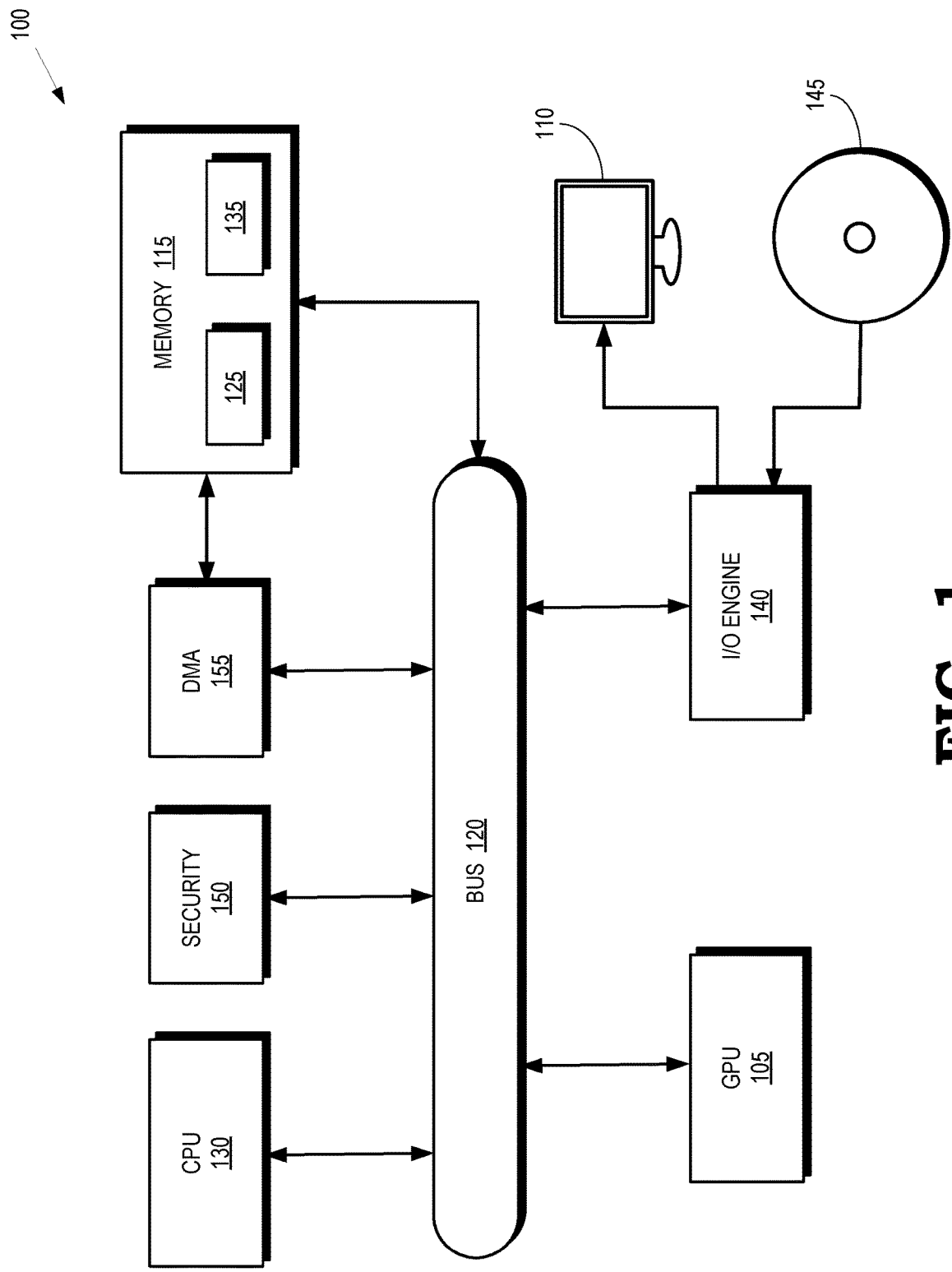
FIG. 1 is a block diagram of a processing system that includes a graphics processing unit (GPU) for creating visual images intended for output to a display according to some embodiments.

Compression leads to serial dependencies between the commands or operations used to compress different chunks of data. For example, a first, most recent command compresses a data chunk using a pointer to a second, previous data chunk (plus a modification of the second data chunk in some cases), which was compressed by a second, previous command that represented the second data chunk as a pointer to a third, earlier data chunk (plus a corresponding modification of the third data chunk in some cases), and so on. Multiple chains of serial dependency are interleaved in some command streams. For example, there may be series of (highly compressible) identical commands to copy a prior value (e.g., a DWord, a short word, or a byte) to the output. The series could be matched to a prior pattern of values, which is then used to replicate the pattern to generate the output. However, since the source of the current command in the stream is the result of a prior command in the stream, the identified pattern of commands needs to be executed serially. Execution of the commands is further complicated if the replicated command adds a value (such as one) to generate the next output, e.g., to generate an incrementing series of values.

Operations that are performed by a stream of commands, such as the commands used to implement decompression, are combined to generate a single command that operates within a predetermined address range such as a 32 byte window corresponding to a cache line. Commands that are received at a front end of a pipeline are stored in a buffer. As each new command arrives at the front end, the new command is compared to commands that were previously received at the front end and stored in the buffer. If the new command matches one of the previously received commands, the new command and the matching previous command are combined into an aggregate command that is stored in the buffer for eventual dispatch to a back end of the pipeline. In some embodiments, a comparison of the new command with the matching command includes comparing write addresses or read addresses of the new and matching commands, as well as determining whether the write and read addresses are within the same address range such as the 32 byte window. The aggregate command is stored in the buffer for comparison with subsequently received commands. The buffer can include multiple different aggregate commands such as aggregate commands associated with interleaved chains of serially dependent commands. In some embodiments, combining the new and matching commands includes defining a mask that is applied to the data in the address range associated with the new and matching commands to identify addresses that are operated on by the aggregate command. For example, if the command stream includes a first command that operates on data at a first offset from a current address and a second command that operates on data at a second offset from a current address, the aggregate command includes a mask that is defined based on the first and second offsets.

FIG. 1 is a block diagram of a processing system 100 that includes a graphics processing unit (GPU) 105 for creating visual images intended for output to a display 110 according to some embodiments. The GPU 105 executes instructions stored in a memory 115. Some embodiments of the memory 115 are implemented as a dynamic random access memory (DRAM). However, the memory 115 can also be implemented using other types of memory including static random access memory (SRAM), nonvolatile RAM, and the like. In the illustrated embodiment, the GPU 105 communicates with the memory 115 over a bus 120. However, some embodiments of the GPU 105 communicate with the memory 115 over a direct connection or via other buses, bridges, switches, routers, and the like. The GPU 105 can store information in the memory 115 such as the results of the executed instructions. For example, the memory 115 can store a copy 125 of instructions from a program code that is to be executed by the GPU 105. Some embodiments of the GPU 105 include multiple processor cores, compute units, or fixed function circuitry (not shown in the interest of clarity) that independently execute instructions concurrently or in parallel.

The processing system 100 includes a central processing unit (CPU) 130 for executing instructions. Some embodiments of the CPU 130 include multiple processor cores (not shown in the interest of clarity) that independently execute instructions concurrently or in parallel. The CPU 130 is also connected to the bus 120 and can therefore communicate with the GPU 105 and the memory 115 via the bus 120. The CPU 130 can execute instructions such as program code 135 stored in the memory 115 and the CPU 130 can store information in the memory 115 such as the results of the executed instructions. The CPU 130 is also able to initiate graphics processing by issuing draw calls to the GPU 105. The GPU 105 renders the object to produce values of pixels that are provided to the display 110, which uses the pixel values to display an image that represents the rendered object.

An input/output (I/O) engine 140 handles input or output operations associated with the display 110, as well as other elements of the processing system 100 such as keyboards, mice, printers, external disks, and the like. The I/O engine 140 is coupled to the bus 120 so that the I/O engine 140 communicates with the GPU 105, the memory 115, or the CPU 130. In the illustrated embodiment, the I/O engine 140 reads information stored on an external storage medium 145, such as a compact disk (CD), a digital video disc (DVD), and the like. The external storage medium 145 stores information representative of program code used to implement an application such as a video game. The program code on the external storage medium 145 is written to the memory 115 to form the copy 125 of instructions or the program code 135 that are to be executed by the GPU 105 or the CPU 130, respectively.

The processing system 100 also includes a processor 150 for performing encryption, decryption, compression, decompression, and other functions used to provide security for information conveyed within the processing system 100, received by the processing system 100 from an external entity, or transmitted by the processing system 100 to an external entity. Some embodiments of the processor 150 decompress data streams that include literal data, pointers indicating a relative location of data, and commands that are applied to compress or decompress the data. The processor 150 can also include circuitry that combines operations used to decompress the received data, as discussed below.

In the illustrated embodiment, direct memory access (DMA) logic 155 provides access to the memory 115, although some entities access the memory 115 directly. The DMA logic 155 generates addresses and initiates memory read or write cycles. For example, the GPU 105, the CPU 105, the I/O engine 140, and the processor 150 read information from the memory 115 and write information to the memory 115 via the DMA logic 155. In some embodiments, the processor 150 and the DMA logic 155 are implemented as a single entity. Some embodiments of the DMA logic 155 are used for memory-to-memory data transfer or transferring data between the compute units in the GPU 105 or processor cores in the CPU 130. The GPU 105 or the CPU 130 can perform other operations concurrently with the data transfers being performed by the DMA logic 155, which may provide an interrupt to the GPU 105 or the CPU 130 to indicate that the transfer is complete.

Figure 2:
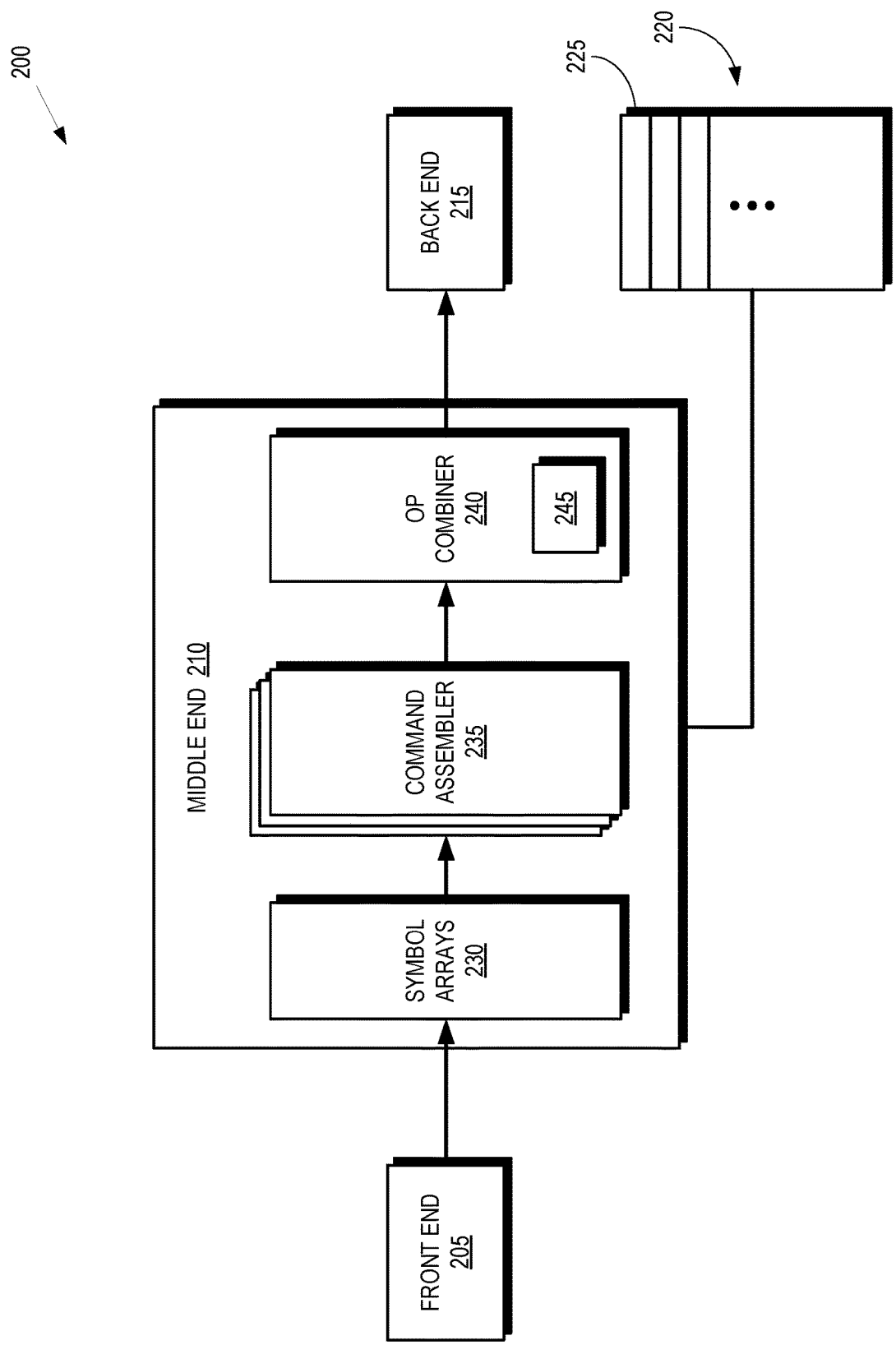
FIG. 2 is a block diagram of a decoder that is used to decode and decompress information transmitted within or between processing systems according to some embodiments.

FIG. 2 is a block diagram of a decoder 200 that is used to decode and decompress information transmitted within or between processing systems according to some embodiments. The decoder 200 is implemented in some embodiments of the processing system 100 shown in FIG. 1. For example, the decoder 200 can be implemented in the processor 150 or in other entities within the processing system 100. The decoder 200 is partitioned into a front end 205, a middle end 210, and a back end 215. The decoder 200 includes (or is associated with) a cache 220. Cache lines 225 (only one indicated by a reference numeral in the interest of clarity) in the cache 220 store compressed data received by the decoder 200 and decompressed data produced by executing commands from the bitstream. The cache lines 225 have a predetermined length such as 32 bytes. In some embodiments, the cache 220 is implemented as a buffer and ranges of the cache lines 225 are windows into portions of a memory such as an external DRAM or shared SRAM. The buffer does not include tags of the cache lines 225.

The front end 205 receives a compressed bitstream that includes literal data that is stored in the memory location indicated by a physical address, pointers that indicate locations of data relative to a current address, and commands that include one or more source addresses of data that are input to the command, a target address of data that is written by the command, and (in some cases) modifications to the input data such as adding, appending, or concatenating a zero to the input data. The front end 205 decodes the commands received in the compressed bitstream. In some embodiments, the front end 205 decodes the commands based on a Huffman table that is defined using information that preceded the commands in the compressed bitstream. The front end 205 provides the decoded commands to the middle end 210.

The middle end 210 includes a set of symbol arrays 230 that stores symbols received from the front end 205, including the decoded commands. The middle end 210 also includes a command assembler 235 that generates information that represents the commands. In some embodiments, the command assembler 235 provides commands that include a literal length that indicates a number of bytes of literal data that are copied and conditionally added to previously received data, a match length that indicates a number of bytes that are copied from the previously received data, and a match offset that indicates an offset to the previously received data from the end of the offset of the literal data.

An operation (op) combiner 240 receives the command information from the command assembler 235. Some embodiments of the op combiner 240 are implemented as a flow-through pipeline that is pipelined as deep as needed to satisfy timing requirements, except for a last serialization cycle that pulls out a single back end command from a collapsed array of byte commands. The op combiner 240 includes a buffer 245 that stores commands received from the command assembler 235 and aggregate commands generated by the op combiner 240. The op combiner 240 aggregates commands received from the command assembler 235 that are associated with the same cache line 225. Some embodiments of the op combiner 240 receive a command that includes one or more source (or read) addresses for data read by the received command. The command also includes a destination (or write) address for data that is written by the first command. In some cases, the read and write addresses indicate the beginning of a cache line 225 and the command includes offsets that indicates a location for reading or writing data within the cache line 225. The op combiner 240 compares the read and write addresses received from the command assembler 235 with read and write addresses of commands stored in the buffer 245. A match occurs if the read and write addresses indicate the same cache line 225, e.g., the read and write addresses in the received command and the buffered command are the same. The op combiner 240 combines the received command with the buffered command in response to a match between the read and write addresses.

The op combiner 240 attempts to collapse as many command packets into as few aggregate commands as possible. The aggregate commands are then provided to the back end 215. Reducing the number of aggregate commands provided to the back end 215 optimizes the throughput of the back end 215 and, consequently, optimizes the throughput of external memory interfaces. The back end 215 examines read addresses in the commands (which include the aggregate commands generated by the op combiner 230) and issues fetch commands as needed. The back end 215 also pops, aligns, and expands literal data in the bitstream.

Figure 3:
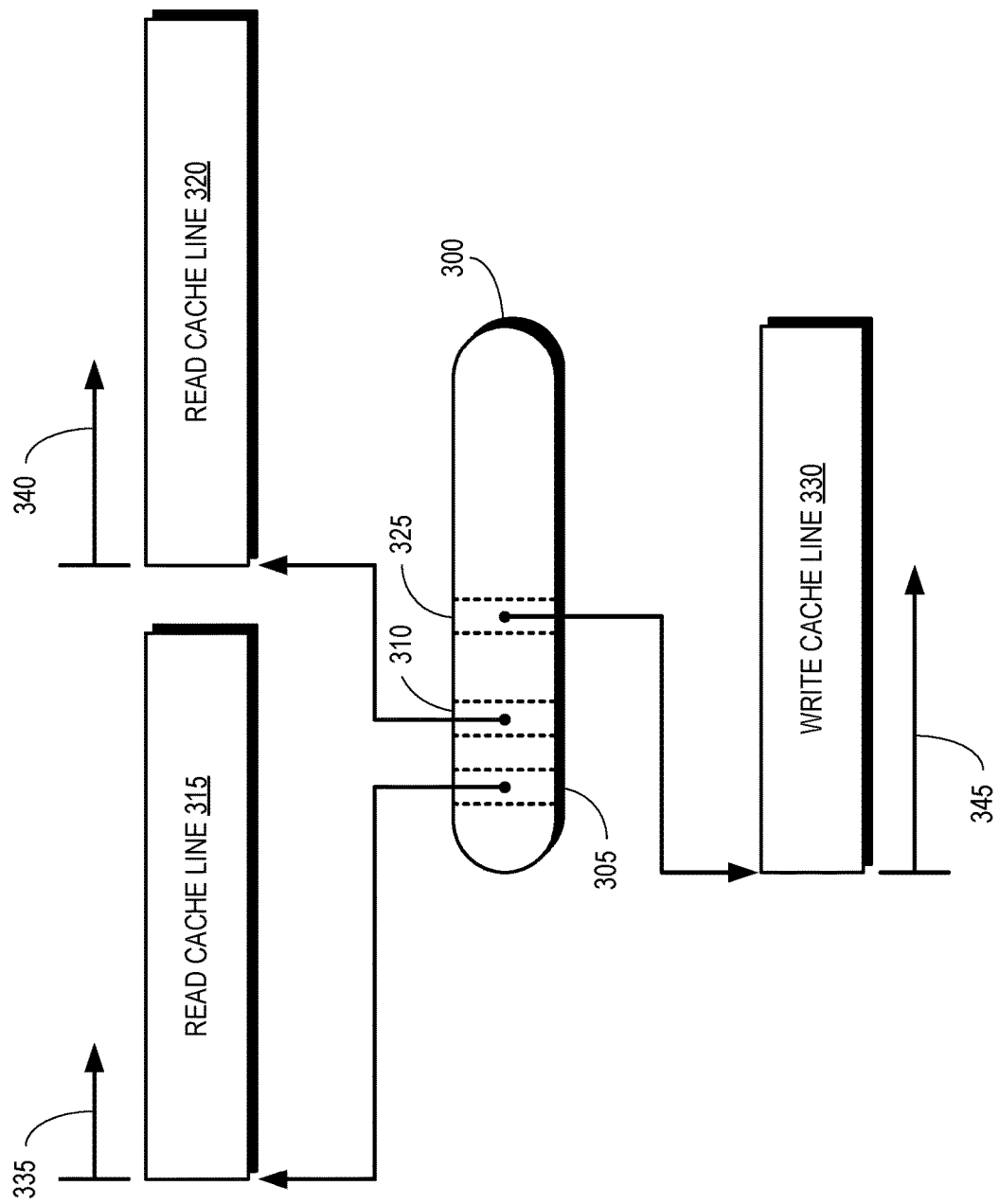
FIG. 3 is a block diagram of a command according to some embodiments.

FIG. 3 is a block diagram of a command 300 according to some embodiments. The command 300 is received by a decoder that includes an op combiner such as the op combiner 240 shown in FIG. 2. The command 300 operates on data that is stored in one or more cache lines and writes the results of the operation to another cache line, which may or may not be different than the cache lines including the input data. In the illustrated embodiment, the decoder concurrently processes information associated with two cache lines, e.g., so that the decoder can decode commands that use input data that is not aligned with cache line boundaries and therefore straddles the cache lines. The two cache lines are associated with different banks.

The command 300 therefore includes addresses 305, 310 that indicate the read cache lines 315, 320, respectively. Although the read addresses 305, 310 indicate the start addresses of different cache lines 315, 320, some embodiments of the command 300 include read addresses 305, 310 that indicate the same cache line. The command 300 can also include a single read address that indicates either of the cache lines 315, 320. The command 300 also includes an address 325 that indicates a write cache line 330. Data generated by an operation represented by the command 300 is written to a location in the write cache line 330.

Offsets indicate the location of the data in the cache lines 315, 320, 330. The offsets are included in the command 300. For example, the command 300 includes information indicating the offset 335 from the beginning of the cache line 315 to the location of the input data in the cache line 315. For another example, the command 300 includes information indicating the offset 340 from the beginning of the cache line 320 to the location of the input data in the cache line 320. For yet another example, the command 300 includes information indicating the offset 345 from the beginning of the cache line 330 to the location that is written by the command 300. In some embodiments, the portion of the data that is read from the locations in the cache line 315, 320 indicated by the addresses 305, 310 and the offset 335, 340, respectively, is represented by a mask. Combining the command 300 with another command therefore includes merging the masks for the two commands.

Figure 4:
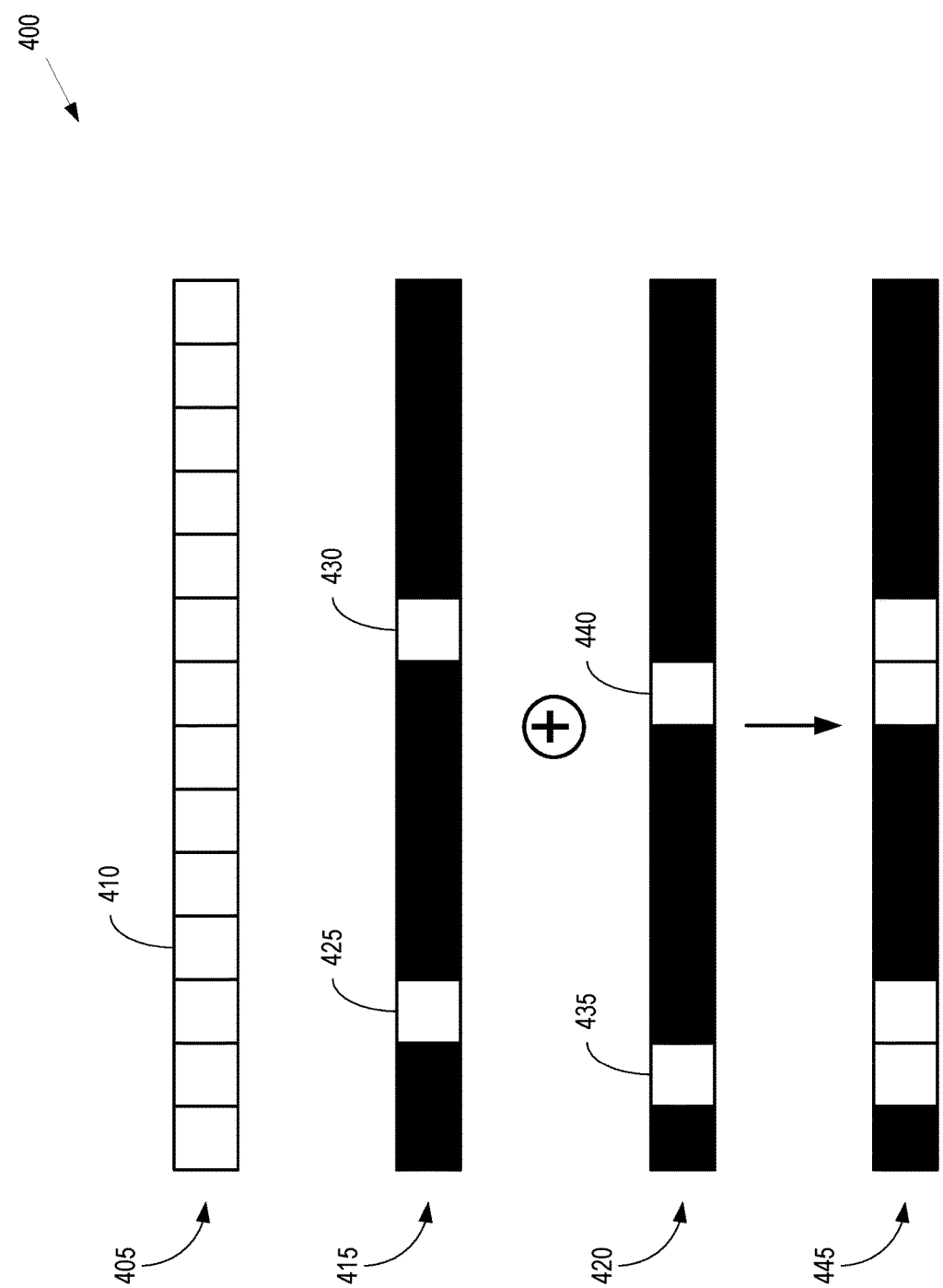
FIG. 4 is a block diagram of a merger of masks that represent portions of a cache line that are input to different commands according to some embodiments.

FIG. 4 is a block diagram of a merger 400 of masks that represent portions of a cache line 405 that are input to different commands according to some embodiments. The merger 400 is performed by some embodiments of the op combiner 240 shown in FIG. 2, e.g., when combining commands to form an aggregate command. The cache line 405 is partitioned into portions 410 (only one indicated by a reference numeral in the interest of clarity) that represent data such as compressed data from a compressed bitstream. The size of the portions 410 is arbitrary and different portions have different sizes in some cases, e.g., one subset of the portions 410 can have a size of three bytes and another subset of the portions 410 can have a size of one byte.

Masks 415, 420 are generated for corresponding commands. In some embodiments, the masks 415, 420 are generated based on read addresses and corresponding offsets in the commands that indicate locations of the portions 410 that are read by the corresponding commands. The commands also include information indicating sizes of the portions 410. In the illustrated embodiment, the mask 415 indicates that the first command reads data from the locations 425, 430 in the cache line 405. The mask 420 indicates that the second command reads data from the locations 435, 440 in the cache line 405. Although the masks 415, 420 indicate locations 425, 430, 435, 440, respectively, masks generated for other commands can indicate a single location, locations within multiple cache lines, and the like.

The masks 415, 420 are merged to form an aggregate mask 445 that is used by a corresponding aggregate command. In the illustrated embodiment, the aggregate mask 445 indicates the locations 425, 430, 435, 440 that are accessed as inputs to the aggregate command. Using the aggregate mask 445 allows the aggregate command to access the locations 425, 430, 435, 440 concurrently.

Figure 5:
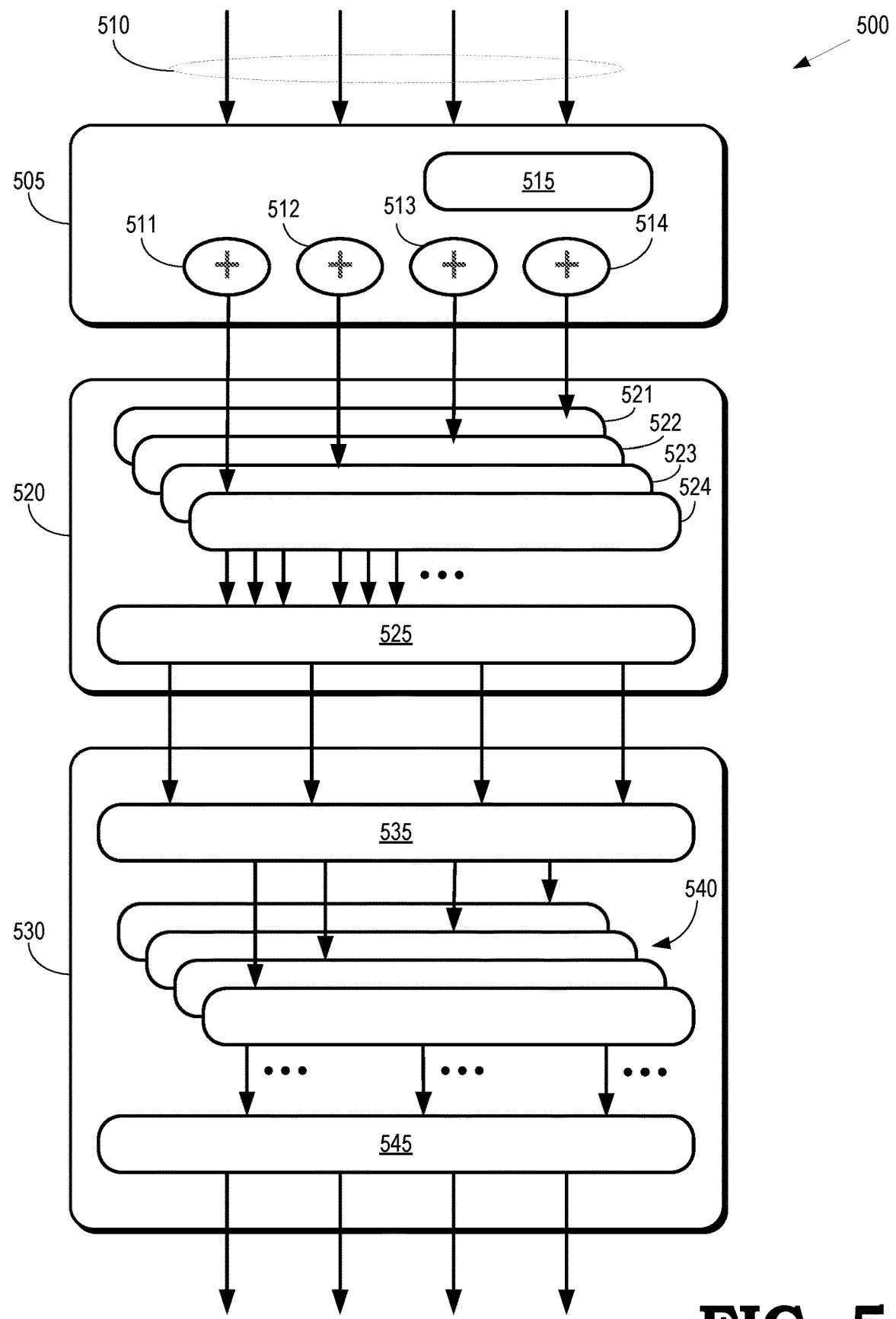
FIG. 5 is a block diagram of a first portion of an op combiner according to some embodiments.

FIG. 5 is a block diagram of a first portion 500 of an op combiner according to some embodiments. The first portion 500 is used to implement some embodiments of the op combiner 240 shown in FIG. 2. The first portion 500 includes address assignment circuitry 505 that receives a set 510 of commands from a front end such as the front end 205 shown in FIG. 2. In some embodiments, the set 510 is received from a command assembler that provides an output address that is represented by a literal length, a match length, and a match offset, as discussed above. The output address is reset as part of each new set 510 of commands. Incrementing circuitry 511, 512, 513, 514 increments the output addresses of the commands with each new literal and match. The address assignment circuitry 505 stores a copy of a current address 515 that is being processed by the op combiner. Output from the incrementing circuitry 511-514 is a write address, a literal read address, and a match read address. In some cases, the absolute addresses are subsequently used by the op combiner to compare how the commands align to memory or cache lines of the operation pipeline.

Some embodiments of the address assignment circuitry 505 implement the following pseudocode to generate output addresses and update the current address:

```
LiteralWriteAddress      = currentAddress
SubLiteralOffset         = previousMatchOffset
if (hasSubliterals)
    SubLiteralAddress = currentAddress − SubLiteralOffset
MatchWriteAddress = currentAddress + LiteralLength
matchWrapsAtWriteStart = MatchLength > MatchOffset
if (matchWrapsAtWriteStart)
    MatchRead        = MatchOffset
else:
    MatchRead        = MatchLength
MatchAddress         = currentAddress + LiteralLength − MatchOffset
currentAddress       += LiteralLength + MatchLength
```

The pseudocode is chained across the set 510 of commands, which potentially generates eight subcommands.

Flatten circuitry 520 translates literals and matches into a common command that reads and adds literals. The input command packets received from the address assignment circuitry 505 generates up to two commands. Clamp circuitry 521, 522, 523, 524 clamps the match length of each of the commands received from the address assignment circuitry 505. In some embodiments, each input command is translated into one command clamped to a write; two consecutive read lines are also generated. The resulting valid subcommands are pushed from the clamp circuitry 521-524 into a buffer such as an N*2 (8) write+N (4) read first-in-first-out (FIFO) buffer. Thus, if there is a series of matches without literals or literals without matches, they can be collapsed into a single aggregate command. Selection circuitry 525 chooses the next valid N(4) from the same lines. In some embodiments, output from the selection circuitry 525 includes N(4) instances of:

ReadAddress

ReadLength: Matches can be shorter than the WriteLength. Read is repeated to fill the output.

HasLiterals: If true, the sub-command has as many literals as the output write length.

WriteAddress

WriteLength

Alignment circuitry 530 calculates lines needed for reading and writing. The alignment circuitry 530 also unrolls commands that need to write to more than one cache line. In some embodiments, a cache line is an aligned 32 byte address relative to the beginning of the current chunk of data. Reads are executed in one read operation if the writes are limited to one line because two consecutive reads can be performed per write line. As discussed above, the input commands are translated into one command clamped to the write and two consecutive read lines are generated. Commands that are completed and sent on our popped from a buffer (such as the FIFO buffer) in the flatten circuitry 520. Subsequent commands are rotated and pulled in to fill out the next commands in the buffer.

Start/end circuitry 535 in the alignment circuitry 530 is used to calculate the starting and ending lines for the reads and writes based on the read and write addresses received from the flatten circuitry 520. Unrolling circuitry 540 is used to unroll write line transitions and provide the unrolled write lines, read lines, and repeat/rotate information to pick circuitry 545, which chooses the next valid N(4) from the same lines. In some embodiments, the pick circuitry 545 performs an operation that includes picking up to the next N (4) commands that share the same write and read lines as the first one. For example, the pick circuitry 545 operates in a manner similar to the flatten step as a N write+N read FIFO with a filter on the output that only sends the commands with the same read and write lines. Commands that have an unused read bank can be sent with ones that do use the read bank. The output of the pick circuitry 545 is:

WriteLine: 32 Byte aligned address relative to the start of the chunk

WriteLength: Capped to the end of the line and unrolled if it crosses

WriteStart[4:0]: The write address within the line.

ReadLine[2 Banks]: The two not necessarily consecutive 32B read lines

Bank 0 has the even line.

Bank 1 has the odd line.

ReadStart[5:0]: ReadAddress[5:0]

ReadLength[5:0]: Defines where the repeat starts for short reads, does nothing for long reads.

RepeatRotate[6:0]: For long copies that read its own output and needs to repeat source data Some embodiments of the alignment circuitry 530 implement the following pseudocode:

```
# Calculate and cap operation to the line.
{oWriteLine, writestart[4:0]}    = iWriteAddress
writeEnd                          = min(writeStart +
iWriteLength, 32)
length                            = writeEnd - writeStart
oWriteLength                      = length
# Calculate Read Controls
readEnd                           = iReadAddress + iReadLength-1
firstReadLine                     = iReadAddress[:5]
lastReadLine                      = readEnd[:5]
repeatFitsInOneRead               = (lastReadLine - firstReadLine) < 2
if (repeatFitsInOneRead or firstCycleOfCommand)
    repeatRotate = 0
# Calculate read Lines
if (repeatFitsInOneRead):
    oReadLine[firstReadLine[0]]   = firstReadLine
    oReadLine[lastReadLine[0]]    = lastReadLine
else # walk read data and start a new read when needed
    readBank                      = iReadAddress[5]
    oReadLine[readBank]           = iReadAddress[:5]
    readLine2                     = (iReadAddress + length-1)[:5]
    readBank2                     = readLine2[5]
    oReadLine[readBank2]          = readLine2
# detect and advance to next
NextWriteAddress = iWriteAddress + length
NextWriteLength = iWriteLength - length
if(repeatFitsInOneRead):
    oNextRepeatRotate = (repeatRotate + length) %
iReadLength
else:
    oNextReadAddress += length
oHasMore = (NextWriteLength > 0)
```

The output ReadLines can come from different commands as long as two commands don't have differing valid read lines on the same bank.

Figure 6:
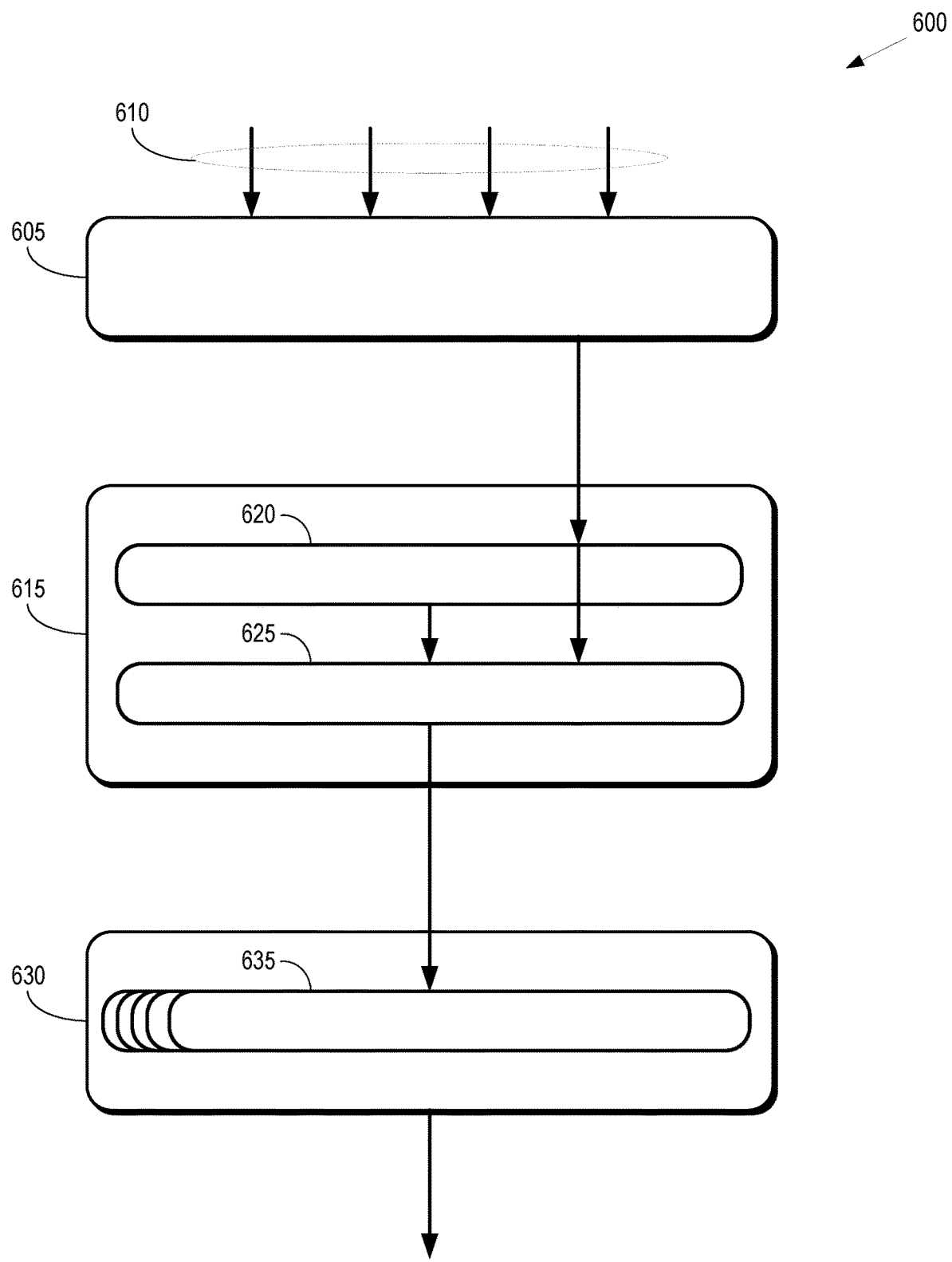
FIG. 6 is a block diagram of a second portion of an op combiner according to some embodiments.

FIG. 6 is a block diagram of a second portion 600 of an op combiner according to some embodiments. The second portion 600 is used to implement some embodiments of the op combiner 240 shown in FIG. 2. The second portion 600 includes byte blast and collect circuitry 605 that receives input commands 610 from alignment circuitry such as the alignment circuitry 530 shown in FIG. 5. In the illustrated embodiment, the byte blast and collect circuitry 605 receives four input commands 610 and the circuitry 605 converts the Read {Address, Length} and {Write Address, Num Literals} for the input commands 610 into per byte multiplexer controls. The WriteAddress[4:0] and WriteLength for each of the input commands 610 is converted into a byte mask such as the masks 415, 420 shown in FIG. 4. For each command whose read and write lines match the read and write lines of the first command, a valid byte is selected. The valid bytes do not overlap.

Some embodiments of the byte blast and collect circuitry 605 compute the following for the input commands 610:

Output Per Byte[0 . . . 31]:

ReadSelect: Which byte from 0 to 63 of the read lines. The "odd" one on the MSBs ReadEnable: If a Read needs to be added in LiteralSelect: Which Literal in the batch for this write line.

From 0 to sum(NumLiterals in all commands with the same write line)-1 in each write line WriteEnable: Whether this byte is enabled LiteralEnable: Whether a literal is needed to be added in Output per collected command:

NumLiterals: Number of literals to pop off

Zero when the next command shares the same write line

Total number of literals for a write line when the write line is completed

WriteLine: Aligned 32 byte address relative to the beginning of the chunk

ReadLine[bank=0 . . . 1]

ReadLineEnable[1:0]: If a read is needed

Some embodiments of the byte blast and collect circuitry 605 implement the following pseudocode:

```
if (newWriteLine)
    consumedLiterals = 0
# compute first literal ID
firstLiterals[0] = consumedLiterals
numLiterals[-1] = 0
for command in [0..3]
    numLiterals[command] = iHasLiterals[command] ?
iWriteLength[command] : 0
    totalLiterals[command]      = numLiterals[command-1] +
numLiterals[command]
    firstLiterals[command]      = totalLiterals[command-1] +
consumedLiterals
for each command with matching lines
    writeEnables [31:0] = (~(0xFFFFFFFF << iWriteLength)) <<
iWriteStart
    literalCount
for b in 0 to 31
    # select the appropriate input command
    command                     = WriteEnables[0..3][b] # is a one hot
mux control.
    writeStart[4:0]             = iWriteStart[command]
    numLiterals[5:0]            = iWriteLength[command]
    oLiteralEnable              = iHasLiterals[command]
    firstLiteral                = firstLiterals[command]
    readLength                  = iReadLength[command]
    repeatRotate                = iReadRotate[command]
    readStart                   = iReadStart[command]
    byteInCommand               = b - writeStart
    oLiteralSelect[b] [4:0]         = oLiteralEnable ?
byteInCommand+firstLiteral: 31
    oReadEnable                 = readLength > 0
    readOffset                  = (byteInCommand + repeatRotate)
% readLength
    oReadSelect[b][5:0]         = (readstart   + readoffset)
    oWriteEnable[b]             = writeEnables[0..3][b] != 0
isLastOfWriteLine       = oWriteEnable[31]
totalConsumedLiterals   =
totalLiterals[LastOne(iCommandValids[0..3]] +
                                consumedLiterals
oNumLiterals            = isLastOfWriteLine ?
totalConsumedLiterals : 0
nextConsumedLiterals    = totalConsumedLiterals
```

Some embodiments of the second portion implement N (4) instances of the byte blast and collect circuitry 605. The instances operate on different commands command and remove the filter that detects incompatible read and write lines between commands in the outputs of the alignment block 530 shown in FIG. 5. This approach has the advantage of performing the byte blast and collect operations more rapidly but can lead to congestion in subsequent operations in the portion 600 of the op combiner.

Combine circuitry 615 stores a predetermined number of previously collected commands that have incompatible write or read lines, e.g., read and write lines that do not match. The combine circuitry 615 combines or aggregates subsequently received commands that are compatible with (e.g., match) one of the stored commands. When a new command is presented, the combine circuitry 615 can merge valid read lines with invalid read lines. The combine circuitry 615 also merges commands with matching read and write lines by selecting the valid byte data from all compatible commands. If the combine circuitry 615 receives a command with incompatible lines, the oldest combined command is pushed out and previously received commands are pushed down to make room for the new command. The (potentially aggregate or combined) commands that are pushed out are provided to a back end such as the back end 215 shown in FIG. 2.

Some embodiments of the combine circuitry 615 store two previously collected commands having read or write addresses that do not match, e.g., incompatible commands. The previous commands are stored in a first combined slot 620 and a second combined slot 625. Newly received commands are stored in the first combined slot 620 and the oldest combined command is stored in the second combined slot 625. Since there are two combiners 620, 625, which may have the same write lines but different read lines, the combine circuitry 615 allows subsequently received commands to jump ahead of a previous command in the second combined slot 625 by combining with the command in the first combined slot 620. The combine circuitry 615 checks to determine if jumping ahead would violate a read-after-write coherency hazard using the following pseudocode:

```
# detect and prevent racing ahead of an existing line.
cantCombineToSlot1 = False
for i in 0..1
    if(iReadLine[i] == Combined[0].WriteLine):
        cantCombineToSlot1 = True
```

The jump ahead is not permitted if a read-after-write coherency hazard is detected.

Dependencies within the combined or aggregated commands are resolved using resolution circuitry 630. A command that is pushed out of the combine circuitry 615 is received by the resolution circuitry 630, which attempts to resolve any read-after-write dependencies in the aggregate command, e.g., using instances of byte-can-go circuitry 635. If the resolution circuitry 630 is unable to resolve the dependencies, bytes before the dependency are sent out as a separate command and then the resolution circuitry 630 attempts to resolve the dependencies in the remaining bytes. Some embodiments of the resolution circuitry 630 implement the following pseudocode:

```
for byte in 0..31
    if (iWriteEnable[byte])
        readBank = iReadSelect[byte][5]
        readLine = iReadLines[readBank]
        readOverlapsWriteLine = iWriteLine == readLine
        if (readOverlapsWriteLine)
            readByte = iReadSelect[byte][4:0]
            if (iWriteEnable[readByte])
                readIsCopying = !iLiteralEnable[readByte] &&
                                    iReadEnable[readByte]
                writeIsAdding =     iLiteralEnable[byte]&&
                                    iReadEnable[byte]
                writeIsCopying =    !iLiteralEnable[byte]&&
                                    iReadEnable[byte]
                # If the hazard is just a match with no literal,
                # just copy the original read+literal instead
                if(writeIsCopying):
                    ReadSelect[byte]        = ReadSelect[readByte]
                    LiteralSelect[byte]     = LiteralSelect[readByte]
        # If the hazard is a read+literal on a read with no
        # literal, use the original read instead
                else if(writeIsAdding && readIsCopying)
                    ReadSelect[byte] = ReadSelect[readByte]
                    # Otherwise there is a read on write hazard
                    # where the add can't be combined
                else
                    ByteCanGo[byte] = False
        # wait until all are unrolled before popping literals.
            oNumLiterals = 0
```

In the above pseudocode, the first ByteCanGo[ ] that is False invalidates prior bytes from consideration by latter bytes with the result being that each false ByteCanGo breaks the command into multiple commands from the 32 byte source. Note that there may be many circular dependencies within one command that can be resolved, so potentially many of these may need to be instantiated and pipelined in series to accomplish the goal.

Figure 7:
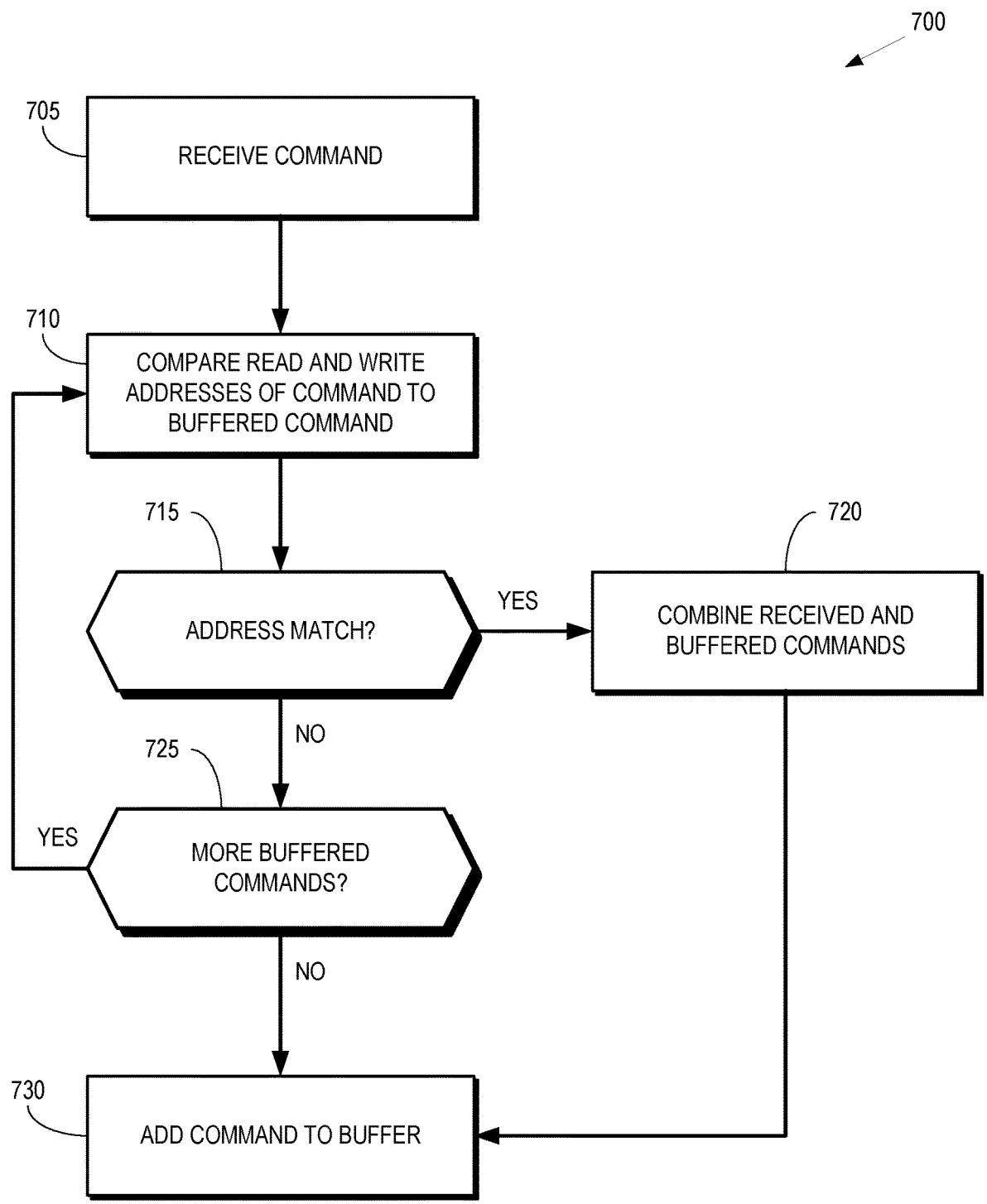
FIG. 7 is a flow diagram of a method of combining matching commands into an aggregate command according to some embodiments.

FIG. 7 is a flow diagram of a method 700 of combining matching commands into an aggregate command according to some embodiments. The method 700 is implemented in some embodiments of the op combiner 240 shown in FIG. 2 and the op combiner illustrated in FIGS. 5 and 6.

At block 705, the op combiner receives one or more commands, e.g., from a command assembler such as the command assembler 230 shown in FIG. 2. The received command includes one or more read addresses that indicate locations of source data for the command. The received command also includes a write address that indicates a location of destination data produced by the command. In some embodiments, the read and write addresses indicate locations in cache lines such as 32 byte cache lines.

At block 710, the op combiner compares the read and write addresses in the received command to read and write addresses in a buffered command that was previously received by the op combiner. The buffered command can be a newly received (e.g., uncombined or unaggregated) command or an aggregate command that was generated by combining two or more previously received commands.

At decision block 715, the op combiner determines whether the read and write addresses in the received command match the read and write addresses in the buffered command. In some embodiments, a command includes up to two read addresses that refer to two cache lines stored in different banks. Depending on the number of read addresses in the command, the op combiner compares one or two read addresses in the received and buffered commands. If the read and write addresses match, the method 700 flows to block 720. If the read and write addresses do not match, the method 700 flows to decision block 725.

At block 720, the op combiner combines the received and buffered commands. In some embodiments, combining the received and buffered commands includes merging masks associated with the received and buffered commands such as the masks 415, 420 shown in FIG. 4. The method 700 then flows to block 730.

At decision block 725, the op combiner determines whether there are more buffered commands that can be compared with the received command. If there are additional buffered commands, the method 700 flows back to block 710. If there are no additional buffered commands, the method 700 flows to block 730.

At block 730, the command is added to the buffer. The command that is added to the buffer is the received command if the read or write addresses in the received command did not match the read and write addresses in any buffered commands. The command that is added to the buffer is a combined or aggregated command if the read or write addresses in the received command match the read and write addresses in one of the buffered commands.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:
1. A method comprising:
receiving a command stream including a first command including at least one first read address for data read by the first command and a first write address for data that is written by the first command;

comparing the at least one first read address and the first write address to at least one second read address and a second write address of a second command stored in a buffer;
combining, in response to the at least one first read address matching the at least one second read address and the first write address matching the second write address, the first and second commands to form a first aggregate command to be subsequently executed, the first aggregate command comprising:
  a read address corresponding to the at least one first read address and the at least one second read address; and
  a write address corresponding to the first write address and the second write address; and
providing the read address and the write address of the first aggregate command together to a back end for execution.

2. The method of claim 1, wherein receiving the first command comprises storing the first command in the buffer in response to the at least one first read address not matching the at least one second read address or the first write address not matching the second write address.

3. The method of claim 2, further comprising:
storing the first aggregate command in the buffer in response to the at least one first read address matching the at least one second read address; and
removing the first command from the buffer in response to the at least one first read address matching the at least one second read address.

4. The method of claim 1, wherein the at least one first read address, the at least one second read address, the first write address, and the second write address indicate a cache line having a predetermined length.

5. The method of claim 4, further comprising:
identifying at least one first portion of the cache line that is read by the first command based on at least one first offset indicated in the first command; and
identifying at least one second portion of the cache line that is read by the second command based on at least one second offset indicated in the second command.

6. The method of claim 5, wherein combining the first and second commands to generate the first aggregate command comprises generating a mask that indicates the at least one first portion and the at least one second portion.

7. The method of claim 1, further comprising:
receiving the command stream including a third command including at least one third read address for data read by the third command and a third write address for data that is written by the third command;
comparing the at least one third read address and the third write address to at least one fourth read address and a fourth write address of a fourth command stored in the buffer; and
combining the third and fourth commands to form a second aggregate command in response to the at least one third read address matching the at least one fourth read address and the third write address matching the fourth write address.

8. The method of claim 7, wherein the first command and the second command are interleaved with the third command and the fourth command in the command stream.

9. The method of claim 1, further comprising:
determining whether a dependency exists between the first command and the second command; and wherein combining the first command and the second command comprises selectively combining the first command and the second command based on whether the dependency exists.

10. An apparatus comprising:
a buffer configured to store a first command of a command stream used to compress data including at least one first read address for data read by the first command and a first write address for data that is written by the first command; and
an operation combiner configured to compare the at least one first read address and the first write address to at least one second read address and a second write address of a second command stored in the buffer, and
wherein the operation combiner is configured to combine, in response to the at least one first read address matching the at least one second read address and the first write address matching the second write address, the first and second commands to form a first aggregate command to be subsequently executed, the first aggregate command comprising:
  a read address corresponding to the at least one first read address and the at least one second read address; and
  a write address corresponding to the first write address and the second write address, and
wherein the operation combiner is further configured to provide the read address and the write address of the first aggregate command together to a back end for execution.

11. The apparatus of claim 10, wherein:
the buffer is configured to store the first aggregate command in response to the at least one first read address matching the at least one second read address, and
the first command is removed from the buffer in response to the at least one first read address matching the at least one second read address.

12. The apparatus of claim 10, wherein the at least one first read address, the at least one second read address, the first write address, and the second write address indicate a cache line having a predetermined length.

13. The apparatus of claim 12, wherein the operation combiner is configured to:
identify at least one first portion of the cache line that is read by the first command based on at least one first offset indicated in the first command, and
identify at least one second portion of the cache line that is read by the second command based on at least one second offset indicated in the second command.

14. The apparatus of claim 13, wherein the operation combiner is configured to generate a mask that indicates the at least one first portion and the at least one second portion.

15. The apparatus of claim 10, wherein:
the buffer is configured to store a third command of the command stream including at least one third read address for data read by the third command and a third write address for data that is written by the third command,
the operation combiner is configured to compare the at least one third read address and the third write address to at least one fourth read address and a fourth write address of a fourth command stored in the buffer, and
the operation combiner is configured to combine the third and fourth commands to form a second aggregate command in response to the at least one third read address matching the at least one fourth read address and the third write address matching the fourth write address.

16. The apparatus of claim 15, wherein the buffer is configured to store the second aggregate command.

17. The apparatus of claim 16, wherein the first command and the second command are interleaved with the third command and the fourth command.

18. The apparatus of claim 10, wherein the operation combiner is configured to selectively combine the first command and the second command based on whether a dependency exists.

19. A method comprising:
   comparing first read and write addresses of a first command in a stream of commands used to compress data to second read and write addresses of a second command in the stream; and
   selectively combining, based on whether the first read and write addresses indicate a cache line and the second read and write addresses indicate the same cache line, the first command and the second command to form an aggregate command to be subsequently executed, the aggregate command comprising:
      a read address corresponding to the first read address and the second read address; and
      a write address corresponding to the first write address and the second write address,
   wherein selectively combining the first command and the second command to form the aggregate command comprises merging a first mask associated with the first command with a second mask associated with the second command to form an aggregated mask, the first mask indicating one or more inputs to the first command and generated based on at least a first offset from a beginning of the cache line and the second mask indicating one or more inputs to the second command and generated based on at least a second offset from a beginning of the cache line, the aggregate mask indicating one or more inputs to the aggregate command based the first mask and the second mask.

20. The method of claim 19, wherein the stream of commands is used to compress graphics data generated by a graphics processing unit.

* * * * *